US006097399A

United States Patent [19]

Bhatt et al.

[11] Patent Number: 6,097,399

[45] Date of Patent: Aug. 1, 2000

[54] DISPLAY OF VISUAL DATA UTILIZING DATA AGGREGATION

[75] Inventors: Devesh Bhatt, Maple Grove; Todd C. Steeves, Shoreview, both of Minn.

[73] Assignee: Honeywell Inc., Morristown, N.J.

[21] Appl. No.: 09/009,462

[22] Filed: Jan. 16, 1998

[51] Int. Cl.[7] .................................................... G06T 11/20

[52] U.S. Cl. .......................... 345/440; 345/130; 358/538; 348/412; 348/415

[58] Field of Search .................................... 345/130, 440; 358/538; 348/412, 415

[56] References Cited

U.S. PATENT DOCUMENTS 5,875,304 2/1999 Winter et al. ...................... 395/200.61

OTHER PUBLICATIONS

Baxes, "Digital Image Fundamentals", pp. 37–39, 1994.

Randall, "What Constitutes A Fine Resolution," PC Magazine, Apr. 21, 1998.

Randall, "What Constitutes a Fine Resolution," PC Magazine, Apr. 1998.

Baxes, Digital Image Processing: Principles and Applications, pp. 37–39, 1994.

*Primary Examiner*—Mark K. Zimmerman

*Assistant Examiner*—Lance W. Sealey

*Attorney, Agent, or Firm*—Robert E. Greenstien

[57] ABSTRACT

A method for visualizing time-varying data from one or more data streams at a different interval than the interval between acquisition of the individual data items in the data stream. Data received is combined, or aggregated, between updates of a display to retain some information from each element. The aggregated data is then displayed at the next update of the display in a number of display elements. The characteristics of the display elements, and the organization of the elements represent changes in the data streams.

37 Claims, 11 Drawing Sheets

DISPLAY OF VISUAL DATA UTILIZING DATA AGGREGATION

TECHNICAL FIELD

The present invention relates generally to methods of displaying data visually. More specifically, it relates to methods for displaying data at a different rate than the data is acquired.

BACKGROUND OF THE INVENTION

Organization and visualization of data substantially affects how well that data can be understood by a user. Visual characteristics of a data display, such as spatial or chromic relationships between elements on the display, shape or size of display elements, and data display rate can all be adjusted to help a user better comprehend the displayed data in a more accurate and/or efficient manner.

One difficulty with visualizing data is that it is rarely acquired at a rate which is ideal for the user to visualize it. In most cases, increasing or decreasing the rate at which the data is displayed will provide information which is not clear from examining the data at the rate the data was acquired. If the data is displayed at a faster rate than is was originally acquired for example, long or medium term trends in the data may become visible which were not visible before. Viewing data at this faster rate also allows data acquired over a period of several hours or days to be visualized in minutes. Displaying data at a slower rate than it is acquired may allow the user to detect events which pass too quickly to see at the speed the data is acquired.

A second problem with visualization of data is that human perception and technology limitations both provide boundaries on the maximum rate visual data may be presented. For example, conscious human perception is typically limited to about 20 changes per second (termed the Persistence of Vision of the user). If the data display is updated at more than 20 times in one second, some of the changes in the data will not be detected by the user. Similarly, data may simply not be displayable at the rate of acquisition due to system limitations, such as network speed (i.e., the communication link between the source of data and the display) or the capabilities of the display itself. An update of graphics on a display sent over a network commonly exceeds the speed capable of the network. Thus, updating a display in real-time with data on the other side of a network becomes a significant communications problem.

There are currently a number of methods for displaying data at a rates other than the rate the data was acquired, or accounting for system data rate limitations. System limitations, for example, may be overcome by storing the data and playing it back later. This solution, has the obvious disadvantage that it means the user is not examining the data in real-time. For some applications real-time examination of the data is crucial. Ignoring some data is one simple method of allowing data, acquired at a rate faster than can be displayed due to system limitations, to be displayed in real-time. It has the disadvantage that ignored data is not seen by the user. Thus, this solution may not be appropriate in situations where the user is attempting to detect specific instantaneous events, or where immediate notification of a particular condition is critical.

When a user is attempting to detect long or medium-term data trends, is it very common to compress the data on the graph by packing the data points very close together without combining data points. Typically the user is limited to estimating standard deviations or major data trends using this technique. Also, this technique cannot be applied to bar graphs or other display types in which each data items writes over the previous data item from the data stream. In other words, it is not useful for display types in which time is not a dimension on the graph. Furthermore, in some instances, individual data items are not the focus of the user's attention so there is no good reason to process each data item individually for display.

Present techniques for visualizing data at a rate faster than it is acquired are furthermore not very effective for dealing with discrete data, in which particular states or transitions are most important. Accelerated displays tend to look like a blur of colors, indecipherable to the user. These accelerated displays also require more concentration, possibly reducing the number of such accelerated elements a user can effectively examine at once.

SUMMARY OF THE INVENTION

The present invention solves these and other problems by providing a method for displaying data at different rates than data is acquired, while still displaying the data in real-time. The techniques described also allow improved display of stored data at rates faster than real-time.

According to the invention, initially, an update interval between each update of a display is set. Data items occurring during the display update interval, or possibly a larger interval if stored data is used, are combined (aggregated) to generate aggregated data. The resulting aggregated data is displayed at the end of the display update interval so that some desired information from each data point is preserved, while allowing the display of data to keep up with, or exceed, the rate of data acquisition.

In the case of stored data, time stamps associated with each data item are used to determine which display update interval a data item falls into. The aggregation then proceeds based on this determination. The stored data may then be viewed at original data rates, or at arbitrarily faster data display rates.

The aggregation may combine data by techniques such as averaging, min/max, critical threshold, or may look for particular combinations of discrete states and transitions between states as a means of detecting crucial conditions. Combinations of these techniques are also possible.

According to the invention, the aggregated data from one or more data streams is displayed using a number of display elements when a display update is to occur. The characteristics of each display element will represent the characteristic of the aggregated data associated with that element. The display elements are typically arranged to indicate some relationship between the data streams as they exist in the physical system.

According to the invention, the display may contain a control panel associated with the display elements for interactive control of the aggregation and the data display by the operator. The control panel allows the operator to change the data play direction, the display update interval, fast forward or slow motion speed, and/or other factors.

A feature of the present invention is that it can be used in many applications to observe the changes in data over time. For instance, it could be used in a communications network of a computer system to show trunk and node connections as a function of the control signals transmitted between phones and computers.

Another feature of the present invention is that the display allows the operator to change the characteristics of the data displayed while simultaneously viewing the data.

Another object of the present invention is to display the time related characteristics of data and allow those characteristics to be observed and replayed at different speeds —e.g. playback of stored data at rates faster or slower than the data was acquired.

Another object of the present invention is allow display of previously stored data, while simultaneously collecting and storing incoming real-time data.

SUMMARY DESCRIPTION OF THE FIGURES

FIG. 1*a* shows a simple case not using aggregation.

FIG. 1*b* shows a simple case using aggregation applicable to real-time display of data.

FIG. 1*c* shows a simple case using aggregation to improve display of data viewed faster than real-time rates.

FIG. 2*a* shows a block diagram for the type of environment in which the applicant's invention is applicable.

FIG. 2*b* shows a flow chart for one possible implementation of the aggregation technique for display of either real-time or stored data.

FIGS. 3*a*–3*d* show graphs which illustrate the medium and long term trends for data with similar averages and standard deviations.

FIG. 4*a* shows the graphs of FIGS. 3*a*–3*d* in a bar chart form.

FIG. 4*b* shows what might be perceived by the user examining the bar chart of FIG. 4*a* if a histogram aggregation were applied to the data.

FIGS. 5*a* and 5*b* show one possible display for a system including digitized analog data in which the applicants' invention may be applied.

FIGS. 9*a*–9*f* shows one method of using aggregation including critical value detection.

Figures 10A, 10B:
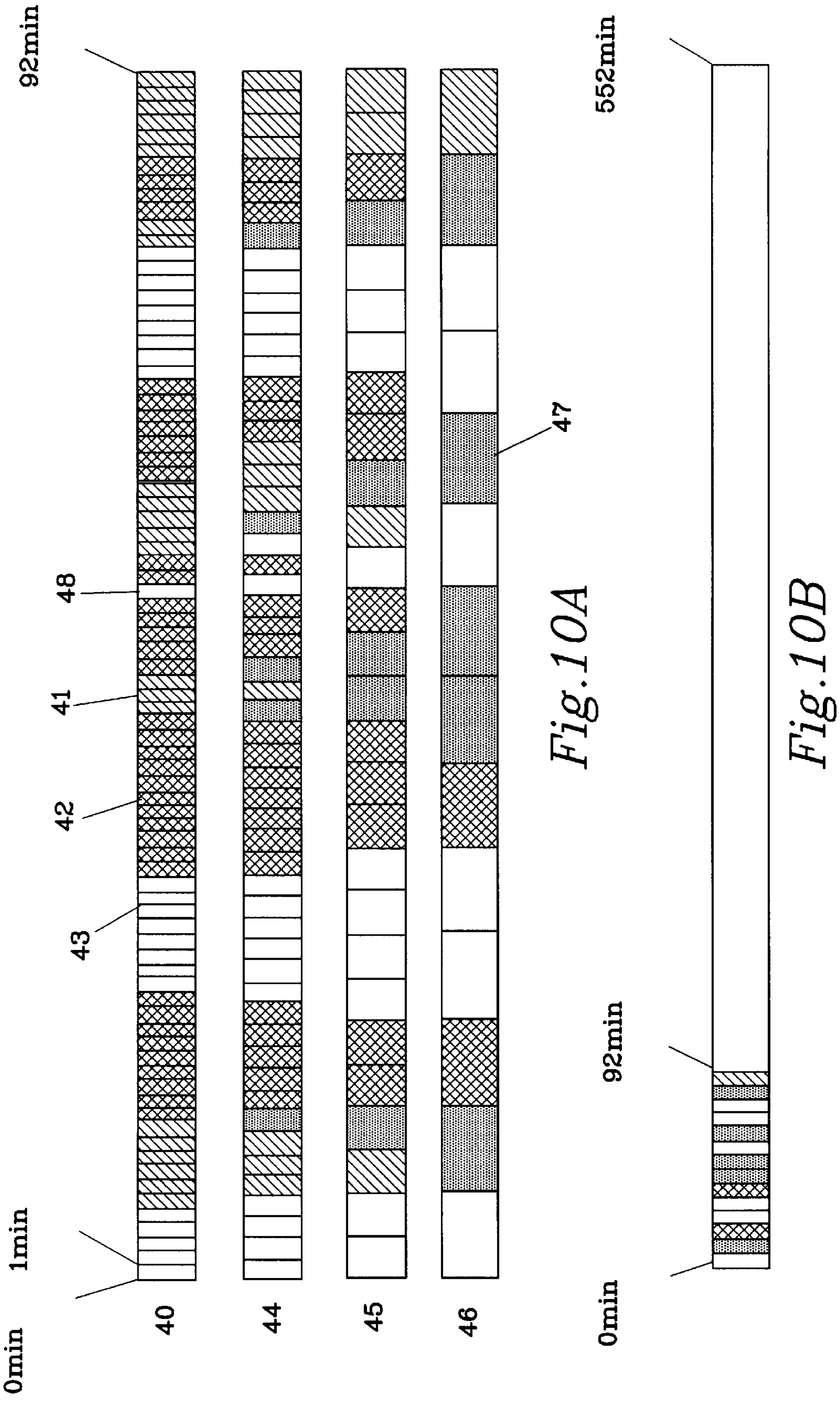

FIG. 10*a* shows one method of using aggregation including multiple state recognition.

FIG. 10*b* shows the last bar of FIG. 10*a* in a compressed, aggregated format.

DETAILED DESCRIPTION OF THE INVENTION

One definition for aggregation, in the context of this application refers to; first, selecting a minimum desired or possible interval between updates of a display on which a stream of data is to be viewed; second, separating the stream of data into sections defined by the selected interval called the update interval; and third, combining all data items in each interval together to form a new set of data—one new data item for each interval of the original data stream. The above definition applies only to data viewed at real-time speeds. If aggregation is applied to stored data, the selected interval for aggregation—the aggregation interval—may be arbitrarily larger than the interval between display updates (i.e., the update interval). For either real-time or stored data aggregation, the method of combining the original data together is chosen so that the aggregated data retains important aspects of the original stream of data. The new data may then be displayed, allowing some information about the original data to be viewed, without having to display every data item in the original stream of data.

In this context, aggregation serves two functions. First, it can be used to display data in real-time even when the data items in the data stream to be viewed occur at a rate faster than the maximum rate at which the display can be updated. Secondly, it can be used to display stored data at arbitrarily faster speeds than real-time speed without loosing detail typically lost when data is viewed in this manner.

Figures 1A, 1B, 1C:
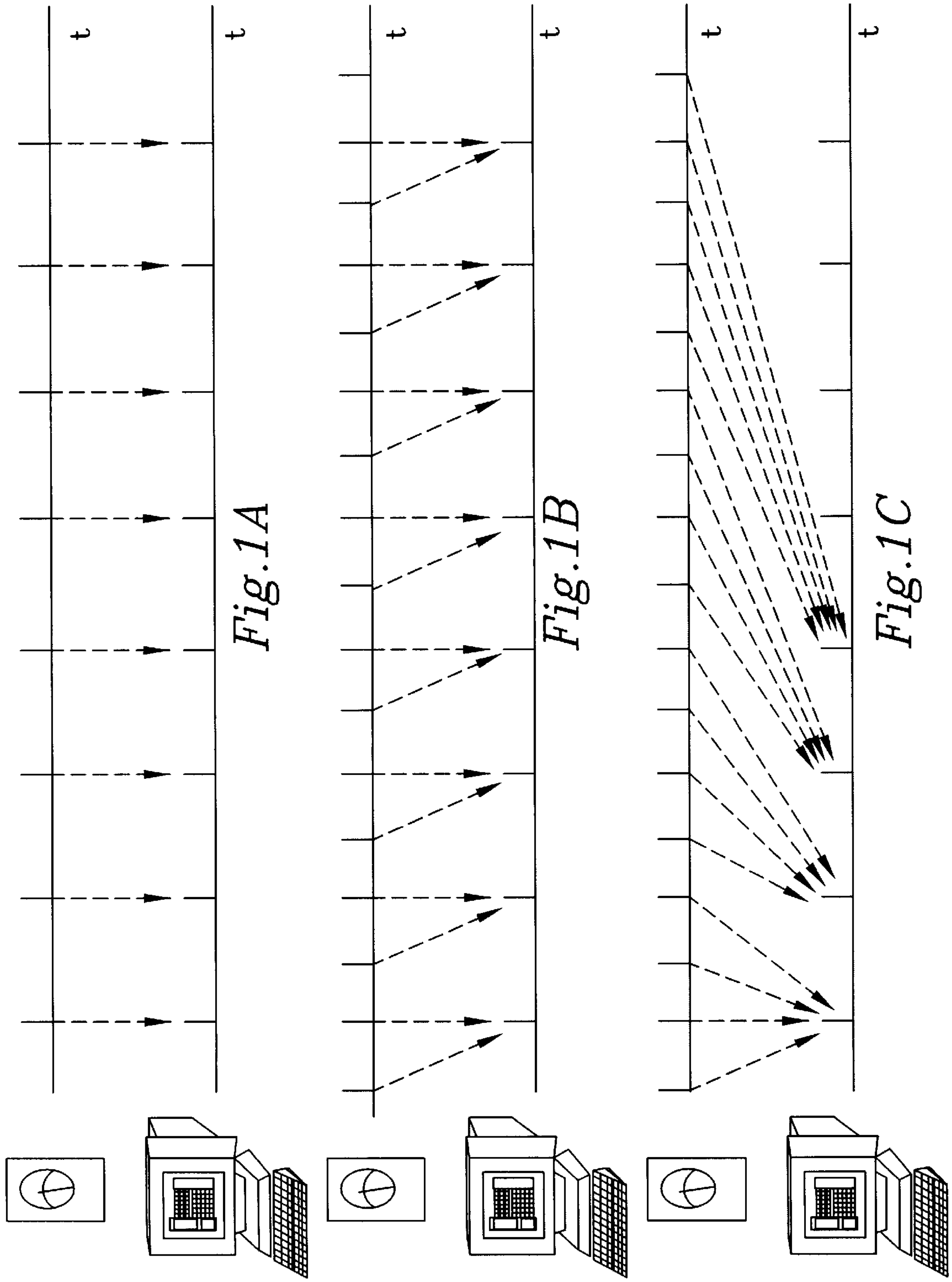

FIG. 1*a* shows a simple case in which no aggregation is performed. In the figure, two time lines are shown. The upper time line indicates points when data items are taken. The data items may, for example, be measurements from a sensor or other device. The lower time line in FIG. 1*a* represents times when an update of a display is performed. The period between each point on the lower time line consequently represents the update interval. The dotted lines shows the data which is displayed for a particular update of the display. Since only one item of data occurs for each update of the display, the display has no difficulty keeping up with data as it becomes available. Thus, no aggregation of data is necessary.

In FIG. 1*b*, a second set of time lines is shown. Again, the upper time line represents when data items occur, and the lower time line represents the updates of the display. In this example, data occurs twice as fast as shown in FIG. 1*a*, while the display update interval has not changed. In this case, the display cannot keep up with the supply of data. Thus, an aggregation interval is selected which is equal to the time between each display update (i.e. each tic on the lower time line of FIG. 1*b*). The data is sectioned into these intervals, and data within each interval is aggregated. As shown in the figure, two data items are aggregated for each display update. Thus, some information about each data item reaches the display, even though each data item is not individually displayed.

As indicated earlier, aggregation may be used to display data at rates faster than real-time speed, if previously stored data is being viewed. For example, if a storage device has collected data overnight, and must be reviewed in the morning for important data trends, the user would like to avoid reviewing all the data at real-time speed, since such a task would take many hours. Aggregation could be used to compress the data, allowing it to be viewed at rates arbitrarily faster than real-time speed. A system involving this level of aggregation is shown in FIG. 1*c*. The upper time line again shows when each data item occurs. Since this data is stored data, this information may actually be a time stamp or other implicit indication of time. For example, the exact time each data item occurred may be calculated from a known fixed interval between data items.

Since the data is stored, it may be displayed arbitrarily faster than it was collected in real-time. For example, if the data was displayed two times faster than real-time, a figure similar to the lower time line of FIG. 1*c* would result. Each update of the display shows data from four data items being aggregated for one display update. The aggregation interval would consequently be approximately the length of time in which four data items are collected.

For the remainder of this application, when viewing data faster than real-time, the degree of speed increase will be described by the speed factor. Mathematically, speed factor is the number of units of data time that corresponds to a single unit of display update time. A speed factor of two, as shown in FIG. 1*c*, means that two minutes of data time are viewed in one minute. Speed factor is similar to the "fast forward" mode of a VCR, although it is more versatile, since it allows an infinite amount of speed control. A VCR is essentially limited to at most the equivalent of a speed factor of four, since a VCR does not aggregate data. The use of speed factor may only be applied to stored data, since future data cannot be aggregated if the data is being displayed in real-time.

Figure 2A:
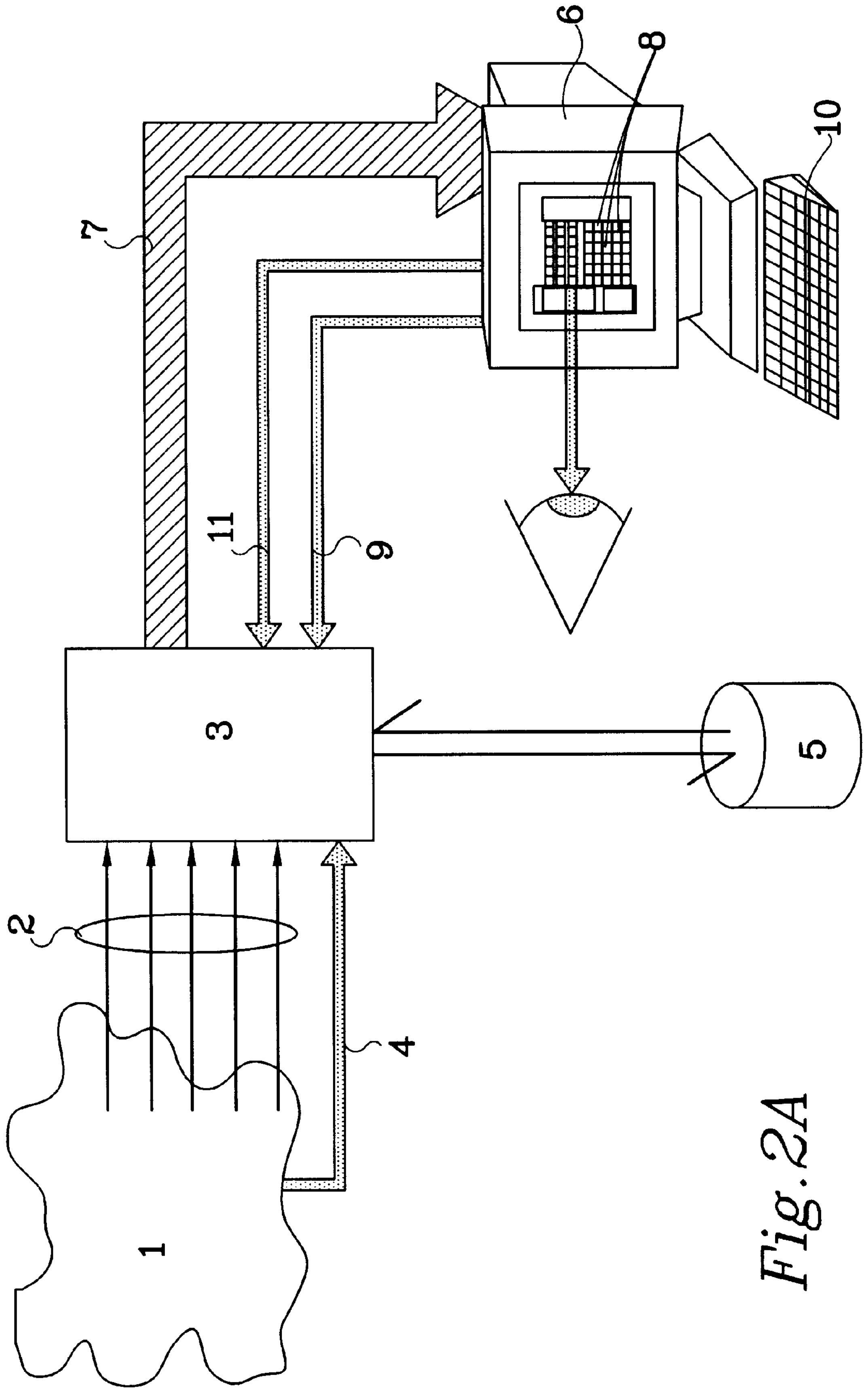

FIG. 2*a* shows a block diagram for the type of environment in which the applicant's invention is applicable. A system or systems 1 to be monitored contain one or more time-varying data streams. Each data stream is comprised of a series of data items. The data streams may contain analog data which has been digitized, continuous-value digital data within a computing system, discrete data, or some combination of these types. Analog data for example, may comprise sensor readings, system load readings, or user interface data (e.g. joystick movement signals). Discrete data may include device or system state indications, or condition indicators, such as runway status (i.e. plane landing, plane taking-off or runway idle). Continuous-value digital data may represent resource utilization signals, navigation data, control variables (e.g. servo motor position), or other data which is digital, but continuous in its native form.

Data streams from system 1, or a plurality of such systems, are sent to an aggregation device 3. While aggregation device 3 will typically be implemented as software, a purely hardware implementation of this device is also possible. Aggregation device 3 may also receive information about the interval between data items in a data stream from system or systems 1 via a separate data speed input or inputs 4. Each of the data streams may have a different interval between data items, or may be aperiodic. Thus, the aggregation device will use input or inputs 4 to determine the set of data items to be aggregated. Information about the interval between data items in the data stream or streams may also be determined by examination of the data streams themselves (e.g. a time stamp associated with each data item), or may be pre-defined within the aggregation device.

As indicated, the data may be periodic or aperiodic, or may include cyclic patters which should be considered in the aggregation. For data occurring aperiodically, the start and end of each interval for aggregation may be determined based on signals received on input or inputs 4. For data which is generally cyclical, the aggregation interval may be lengthened or shortened slightly to match slight variations in the timing of the cyclical patterns.

The aggregation device may communicate with a mass storage device 5 which will save data received from system 1, at the user's option. A secondary smaller storage device may be a part of the aggregation device 3, which may aid in real-time data aggregation. Data may be saved in mass storage device 5 either before or after aggregation of the data or both. Preferably, the data is saved before the aggregation, so that if the data is reviewed in non-real-time, the user has the option to view the data at the highest possible data resolutions or any chosen lower resolution. Of course, storage limitations or other reasons may dictate other storage choices.

System 1 and aggregation device 3 may be implemented in a single computing device 3 as part of the same program, or as part of separate programs. Alternatively, system 1 and aggregation device 3 could be implemented in separate computing devices and connected by an appropriate communication means. Aggregation device 3 may also be implemented in the same computing device as a display 6, or it could be remotely connected to display 6 through appropriate communication links 7. Devices 1, 3, and 6, may also all be implemented in the same computing device.

If aggregated data is sent to display 6 via communication links 7, the communication links may operate at any number of speeds, and may represent numerous types of mechanisms, such as LAN's WAN's radio links, direct connection, modem connections, optical links, etc. The communication streams 2 may operate at a common speed, or a number of different speeds. The signals sent from aggregation device 3 to display 6 on communication links 7 may be called and will be referred to as display control signals. These signals may or may not be converted using an intermediate device to account for communication differences.

Where aggregation is used because network speed is a factor, the aggregation device should be able itself to receive data at the rate data is sent through the data streams. In other words, the aggregation should occur before the data streams are sent over communication links 7 to the display.

The aggregated data sent to the display via the control signals will be arranged on a display 6 in one or more display elements 8. Each display element 8 will represent at least one of the data streams 2 received from system 1. Some display elements may actually represent more than one of the data streams however. For example, load level on two computer processors may be combined and displayed as a single display element. such as a single bar in series of bar charts.

In any event, the visual characteristics of each display element represent information the user's has identified as important about the data stream or streams that element is associated with. The color of each display element, for example, may be selected from a range of colors to show the load level for a device associated with the selected display element. As another example, the shape of the display element may represent whether a device associated with the display element is currently sending or receiving data. As another example, the output from a temperature sensor may be displayed as the length of a bar in a bar graph.

Aggregation done by aggregation device 3 may be adjusted by user input 9 from a user input device 10. In FIG. 2*a*, the input device is shown as a keyboard, but the input device may also be other devices such as a mouse which is used to click on items on the screen. The user input may determine the type of aggregation, the degree of aggregation, the elements which are to be sent to, and displayed on, display 6, or possibly the types of data to be sent to, or received from, mass storage device 5. The degree of aggregation as explained earlier is determined by the desired or necessary display update rate and the desired speed factor. The capabilities of display 6 (i.e. The minimum interval at which the graph may be updated on the display) may also be sent as an input to the aggregation device in the form a display input 11. Display input 11 may also include the maximum data bandwidth supportable by communication link 7. Aggregation device 3 may include an internal value for physical limits of a user's perception (i.e. persistence of vision) or it may receive this data as user input 9. User input 9 may also include a speed factor and a specific value for the display update interval, chosen by the user.

Aggregation of data from system 1 is determined based on either the minimum possible interval between updates of the display supportable by the system, or a user desired value for the interval between updates of the display, whichever is lower. For display of stored data, aggregation may also be affected by the speed factor, which is also set by the user.

A common minimum possible interval between updates for the display is typically determined by the user's perception limits. That is, most users have a maximum limit for viewing data of 20 changes in one second. While in most cases, display graphics have an update rate of 30 updates per second or more, a display type which has a minimum interval between updates of less than 20 updates per second would result in the display graphics speed determining the minimum interval between updates. Furthermore, in some systems, the communications between system 1 and the display may also cause a minimum possible interval between updated lower than the user's persistence of vision. For example, some modem or network connections may be updated at less than 20 updates per second. Overall, the system should select the interval for the slowest device in the system to set display update interval.

The user may choose an display update interval larger than the minimum possible display update interval via user input 9, described above. Thus, the applied display update interval for the display—which will determine the amount of aggregation for the streams of data—is selected either as the minimum possible display update interval defined by the system, or based on user inputs such as the speed factor and minimum display update interval.

The mathematical description of aggregation is now described. For each display update, data items from one or more data stream, falling within an aggregation interval, are aggregated. The aggregation interval, $A_I$, can be calculated as:

$$A_I = U_I * S_F, \quad \text{(Equ. 1)}$$

where:

$S_F$=Speed Factor, and $U_I$=Display update interval.

As indicated above, the display update interval may be defined as the lower of a number of factors:

$$U_I = \max\left\{\begin{matrix} \text{Minimum Display Graphics Display update interval} \\ \text{Persistence of Vision of the User} \\ \text{Minimum interval supported by Network} \\ \text{User selected display update interval} \\ \text{Interval between data items} / S_F \end{matrix}\right\} \quad \text{(Equ. 2)}$$

For example, if the user's persistence of vision—typically 20 updates per second—defines the display update interval, $U_I$=0.05 seconds, and the speed factor, $S_F$ is 1, the aggregation interval, $A_I$ would be:

$$A_I = U_I * S_F = 0.05 \text{ seconds.} \quad \text{(Equ. 3)}$$

Thus, if data items in the data streams occur periodically every 0.01 seconds, and $A_I$ is 0.05 seconds, the number of data items to be aggregated is:

$$A_I / D_I = 0.05/0.01 = 5 \text{ data items,} \quad \text{(Equ. 4)}$$

are aggregated for each interval and the result of each interval's aggregation would be displayed at the next display update.

As a second example, if the user instead selects the display update interval to be 0.1 second, the aggregation interval would be 0.1 second assuming a speed factor of 1. Using the same data interval of 0.01 seconds, 10 data items would now be aggregated per aggregation interval.

For aperiodic data, the number of samples to be aggregated will not be known until aggregation device determines end of the aggregation interval based for example, on input or inputs 4. Further, if aperiodic data is detected in a system, the aggregation technique may be chosen to account for characteristics of such data. For example, the aggregation technique may weigh later samples more than earlier samples in the aggregation interval.

Note that if the data rate is slower than the minimum possible display update interval as defined by the factors outlined above, then the display update interval may be set by the data interval and the speed factor. Specifically, $$U_I = D_I / S_F \quad \text{(Equ. 5)}$$

For example, if the data interval is one second, and the minimum display update interval possible by the system was determined to be 0.05 seconds, then the actual display update interval would be set to 1 second, to match the data interval. Other options, rather than reduce the display update interval, might be to interpolate the data, extrapolate the data forward, or repeatedly display the same data until the next data item is acquired.

Interpolation is only applicable to viewing stored data since to interpolate requires values both before and after the data item to perform the interpolation. Thus, an application specific extrapolation algorithm may be used.

In any event, if the user is viewing stored data, a speed factor may be applied to the aggregation. For a speed factor of 4, and using the same 0.05 display update interval as above, the aggregation interval would be:

$$A_I = U_I * S_F = 0.05 * 4 = 0.2 \text{ second.} \quad \text{(Equ. 6)}$$

With the same data interval, $D_I$, of 0.01 second, now 20 data items would be aggregated for each update of the display.

As this examples show, the above calculation uniformly integrates different aspects of aggregation, in terms if data sample rate, user preference, data sample intervals, and the desired speed factor. The resulting aggregation interval defines the number of specific data items to be aggregated for each update of the display.

Figure 2B:
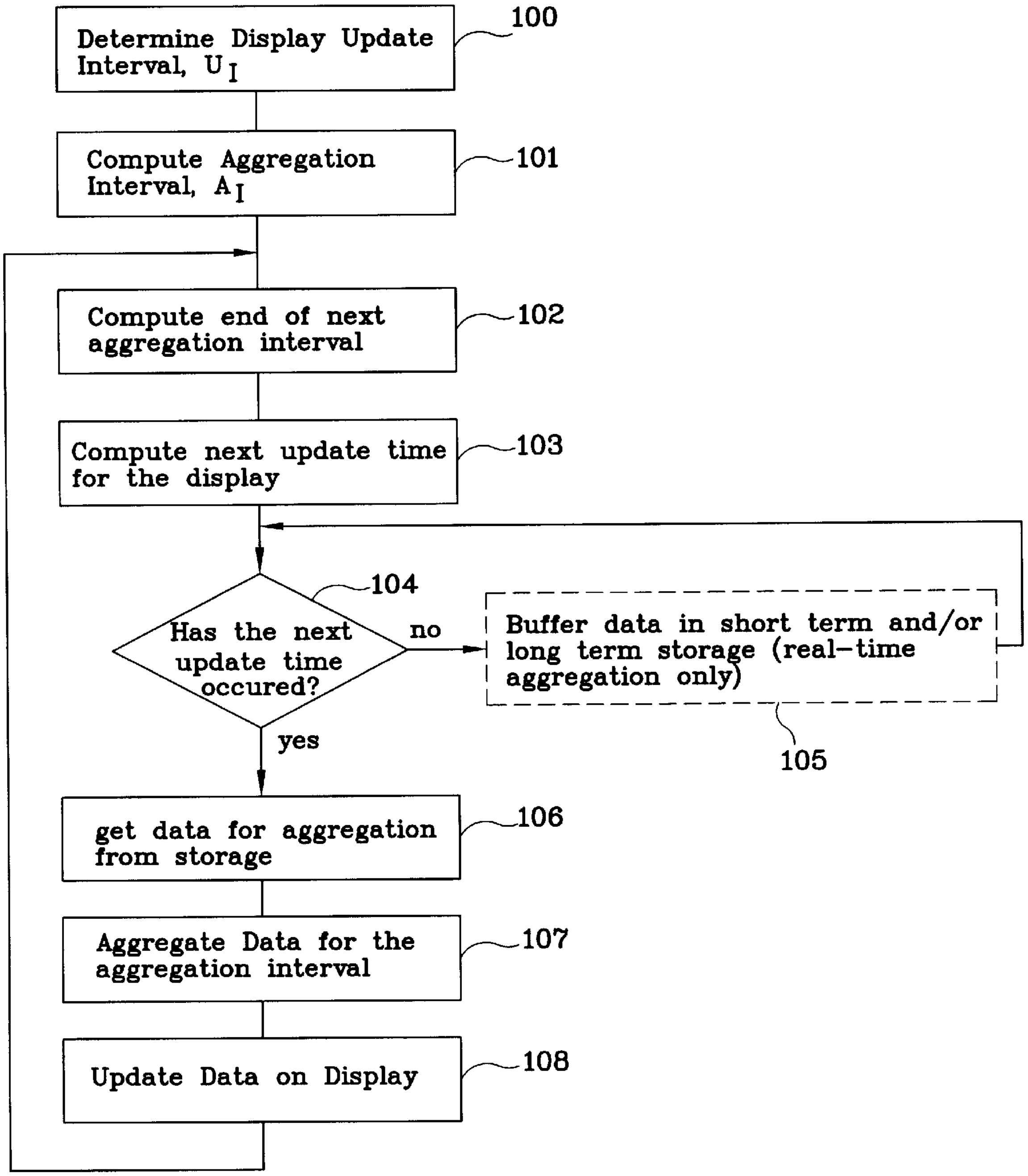
Figure 3A:
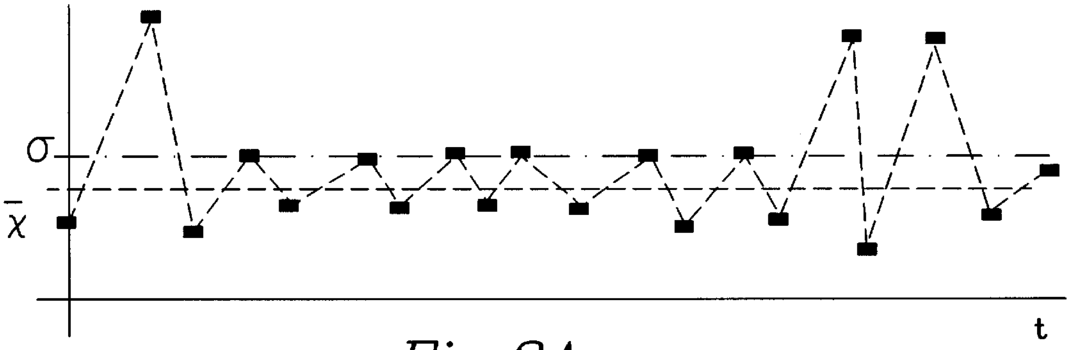
Figure 3B:
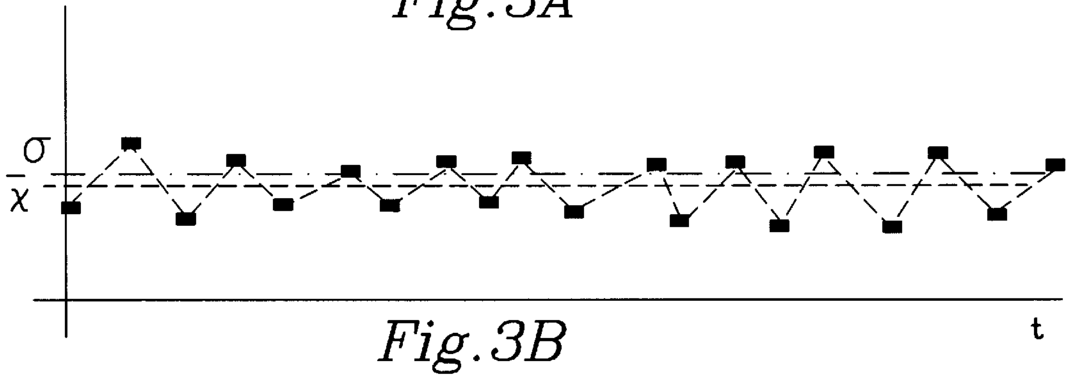
Figure 3C:
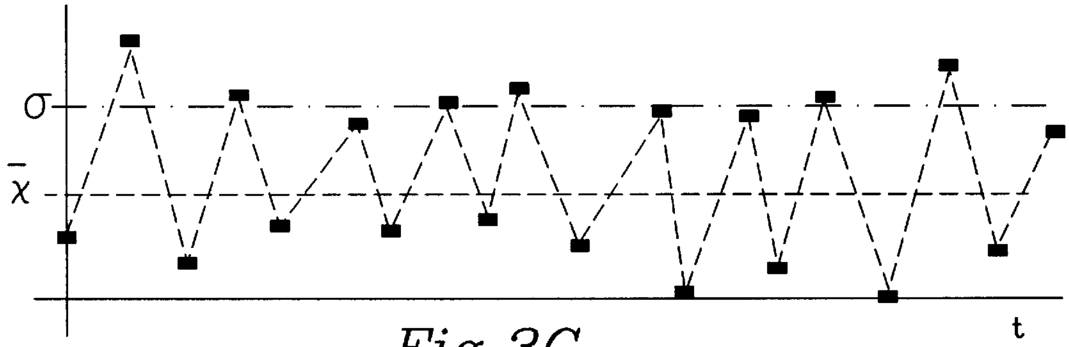
Figure 3D:
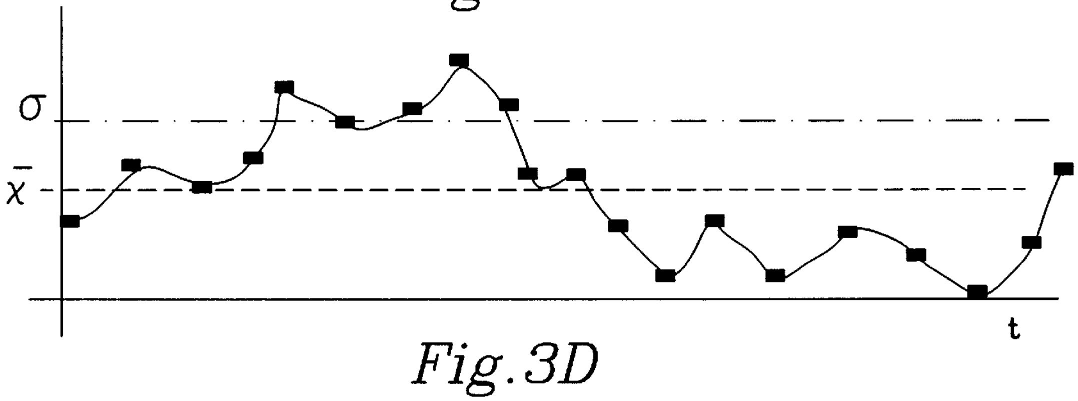

FIG. 2*b* shows a flow chart for one possible implementation of the applicants' aggregation as might be performed by aggregation device 3 in FIG. 2*a*. The steps are labeled, starting at 100. First, an display update interval, $U_I$, is selected in step 100, based on the criteria described in Equ. 2. Second, The aggregation interval, $A_I$, is computed in step 101. For display of real-time data, the aggregation interval will be the same as the display update interval. For playback of stored data, the aggregation interval may be adjusted based on the desired speed factor. Next, in step 102, the aggregation interval is used to calculate when the end of the next aggregation interval will occur. Similarly, the display update interval is used to determine when the next update of the display will occur in step 103.

Aggregation device 3 will then pass into a loop which will check for the next update time. At the top of this loop, the need for the next update is checked, in step 104. If the next update need not occur, data is stored in step 105, in real-time display systems; for play-back systems, aggregation device 3 re-asks if the next update is to occur at step 104. If the update is to occur, then the data to be aggregated for display is retrieved in step 106, aggregated in step 107, and used to update the display in step 108. Once the display is updated, aggregation device returns to step 102, and thereafter recalculates the next update time, the next aggregation interval, and re-starts the loop. It is noted that when applying this embodiment of aggregation device to stored data, the aggregation interval may move forward in time, like the display update interval, or may actually move backwards in time, if the user is viewing data in a fast-reverse mode.

FIGS. 3_a_–3_d_ shows graphs for four different sets of data which will be used to illustrate the benefits of the applicants' aggregation techniques. Each of the graphs shows one second's worth of data. The data in the graphs represent arbitrary sets of data. In each of the graphs, the lower dotted line through the graph represents the average of the data, and the upper dotted line represents the standard deviation of the data. When examining the figures, there are obvious differences in the value of the data at different times in the graphs, even though the averages for all four graphs are the same value. Examination of the standard deviation of the graphs might enable a user to determine differences between some of the graphs, but not all of the graphs. For example, FIG. 3_c_ and FIG. 3_d_ have very similar standard deviations, although the data in the two graphs differ substantially. Some of these differences between the graphs of FIG. 1_c_ and FIG. 1_d_ could be revealed if standard deviations for different numbers of data points were displayed, or some other techniques were used to show the trend differences in these two graphs.

Unfortunately, the user does not always know what trends exist in the data to be able to choose the technique which will reveal the important trends in the data. In the applicants' system, if the user is able to change the degree of aggregation, or possibly even the type of aggregation done, the user may be able to try a number of different displays and discover where important trends in the data may exist.

While graphing of data values versus time, such as FIG. 3_a_–3_d_, is one of the most effective methods of revealing trends in data, such graphs consume large amounts of display space, and limit the number of complicated visual elements (i.e. the number of graphs on the same page, or lines on the same graph) which can be displayed simultaneously. This prevents the user from effectively examining a large amount of separate data simultaneously, especially while the data is moving at a fast rate. Aggregation allows the user to condense the data into smaller display elements without significantly reducing important aspects of the data. Aggregation also allows a larger number of display elements to be examined simultaneously, without loss of accuracy in deciphering the data, by increasing the display update interval of the display.

Figure 4A:
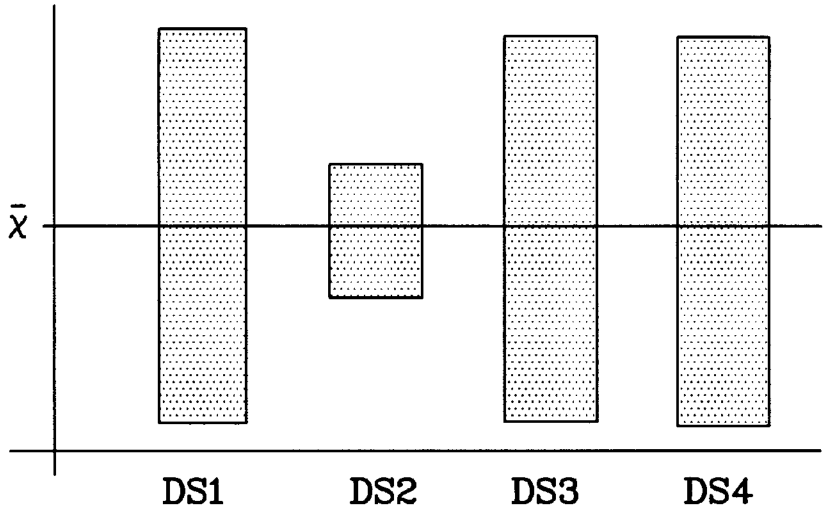
Figure 4B:
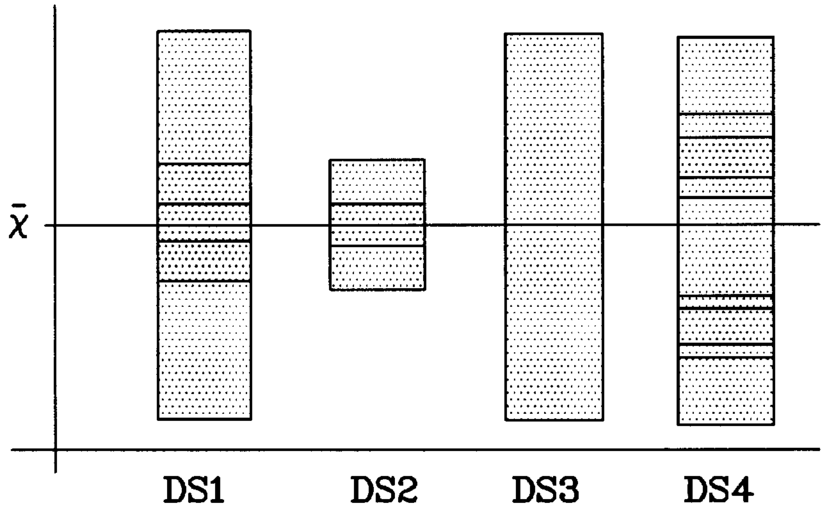

The graph of FIG. 4_a_ depicts what a user might perceive if the data from the graph of FIGS. 3_a_–3_d_ were displayed in a bar chart at one sample every 1/20th of a second (i.e. an display update interval of 0.05 seconds). The same data as the four graphs of FIGS. 1_a_–1_d_ is now contained in FIG. 4_a_ alone, in one quarter the space. As indicated earlier however, one sample every 1/20th of a second represents the limit of human perception for detecting changes in an image. A user examining the graph of FIG. 4_a_, would therefore only perceive portions of each bar char as partially filled or unfilled. The partial filling will also cause flickering of the data on the display, but for the most part this would not provide any reliable information about the data. For example, while the user may be able to detect a difference between DS2 and DS3, the user could not distinguish between DS1 and DS3, even though we can see the data from these two bars is very different from examining FIG. 3_a_ and FIG. 3_c_.

FIG. 4_b_ shows what might be perceived by the user if a histogram-type aggregation were performed on the same data when the user chooses a larger display update interval. Each of the twenty data items from FIGS. 3_a_–3_d_ fall into the same aggregation interval of 1 second, which as explained earlier, is determined by the user's choice of speed factor of 1 and the display update interval of 1 second. With the aggregation performed, some information about each data item is retained on the display for at least one second, rather than 1/20th of a second. Furthermore, less space is used than for the graphs of FIG. 3_a_–3_d_. Obviously, as the amount of aggregation increases, some of the characteristics of the data are lost. However, if the data must be observed in real-time, as it is collected, the applicants' solution will certainly provide more information than one which does not use aggregation, such as shown in FIG. 4_a_. Specifically, the differences between DS1 and DS3 are now clearly detectable by the user in FIG. 4_b_.

FIG. 5_a_ shows one possible display for implementing the applicant's system. On the graphs, three display elements P1, P2, and P3 are shown with their respective labels below each bar. Each display element represents the percentage of time spent in various activities for a different processor in system 1 which is being monitored. Thus for example, the darker portion of each bar may represent time spent in application execution, and the lighter portions of each bar, time spent on communication overhead. The remaining part of each bar could then represent time the processor spends idle.

On the left side of FIG. 5_a_, a control panel 20 is supplied. Control panel 20 allows modification of the display features, characteristics of the aggregation, the data to be displayed, and other desirable features. A file button 21, for example, might allow the user to save data as it is acquired, such as to storage device 5. Alternately, such a button may allow saving of particular displays of data or time periods. An options button 22 might provide access go menus which allow the user to add more or less elements to the graph, or it may allow the user to select among a number of methods of aggregation.

Box 23 provides various display speed control buttons and indicators. Buttons 24 and 25 provide control of the speed factor (i.e. fast forward and fast reverse) for use during playback of stored data. Buttons 26 provides slow forward and reverse, when stored data is viewed at data rates slower than the data was initially acquired. Box 27 is an indicator of the current speed factor. For example, in FIG. 5_a_, the system is set for a speed factor of 2. By repeated clicking of buttons 24–26, the speed factor can be adjusted, each click of button 24 may increase the speed factor by one, for example.

Box 28 allows control of the user's choice for the minimum display update interval. The center of the box shows the current display update interval. Clicking the up and down arrows, respectively, in box 28 increases or decreases the current user's choice for the update interval. Other buttons allow various control of movement of the data on the display. For example, a frame advance button may be provided, as well as a pause button.

Box 29 shows the aggregation interval that corresponds to the current display update on the screen. The lower part of box 29 is a visual indicator of the location of the current aggregation interval being displayed within the entire set of stored data.

Other features may also be provided as the user desires. Capability to zoom in on portions of the y-axis may be provided on the control panel such as by box 30. As another example, a button may allow switching between real-time and playback modes of display, such as provided by button 31, in FIG. 5*a*.

Figure 5A:
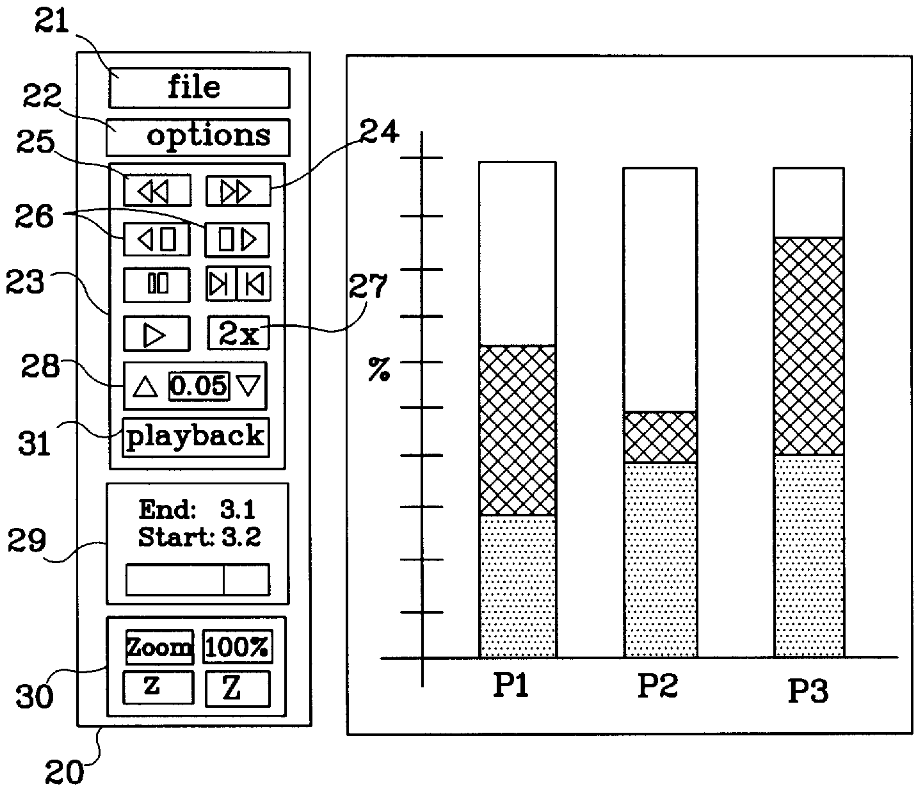

Graph 5*b* shows the same system as FIG. 5*a* at a different instant in time. If the graph of FIG. 5*a* is compared to the graph of FIG. 5*b*, the lighter portion of each bar can be seen to be similar in size, indicating that network overhead time for each processor is constant. Conversely, the application time for each processor experiences significant changes from one graph to the other.

While these details can easily be seen in the snap-shots of the data, if the processor activity moves between these two graphs over some short period of time, for example, every 0.05 second, the user may not be able to detect that the network overhead for processor P2 is constant. This is caused by the fact that when the application bar moves it causes the location of the network overhead portion of each bar to rapidly move between its position in the first graph and the second graph.

By applying aggregation to the graph, for example, by averaging data items, we can increase the length of the display update interval to one second. This will cause the location of the darker bar in each graph to move a significantly smaller amount. This might allow the user more opportunity to detect that the network load for each processor is actually constant. Furthermore, even if the location of the darker bar did not move any less, the user might have more time to detect that the lighter bar's size remains constant. At this aggregation level, or possibly at an increased aggregation level, an average for application load may also be detected from the graphs.

Of course, it would also be possible to reveal the same data by producing separate graphs or displaying numerical data for the processor loads. However, these methods would require more display space, and would not have the versatility of the displays of FIGS. 5*a* and 5*b*, which allow examination of many aspects of the data, using aggregation, without the need to develop new displays.

Figure 6:
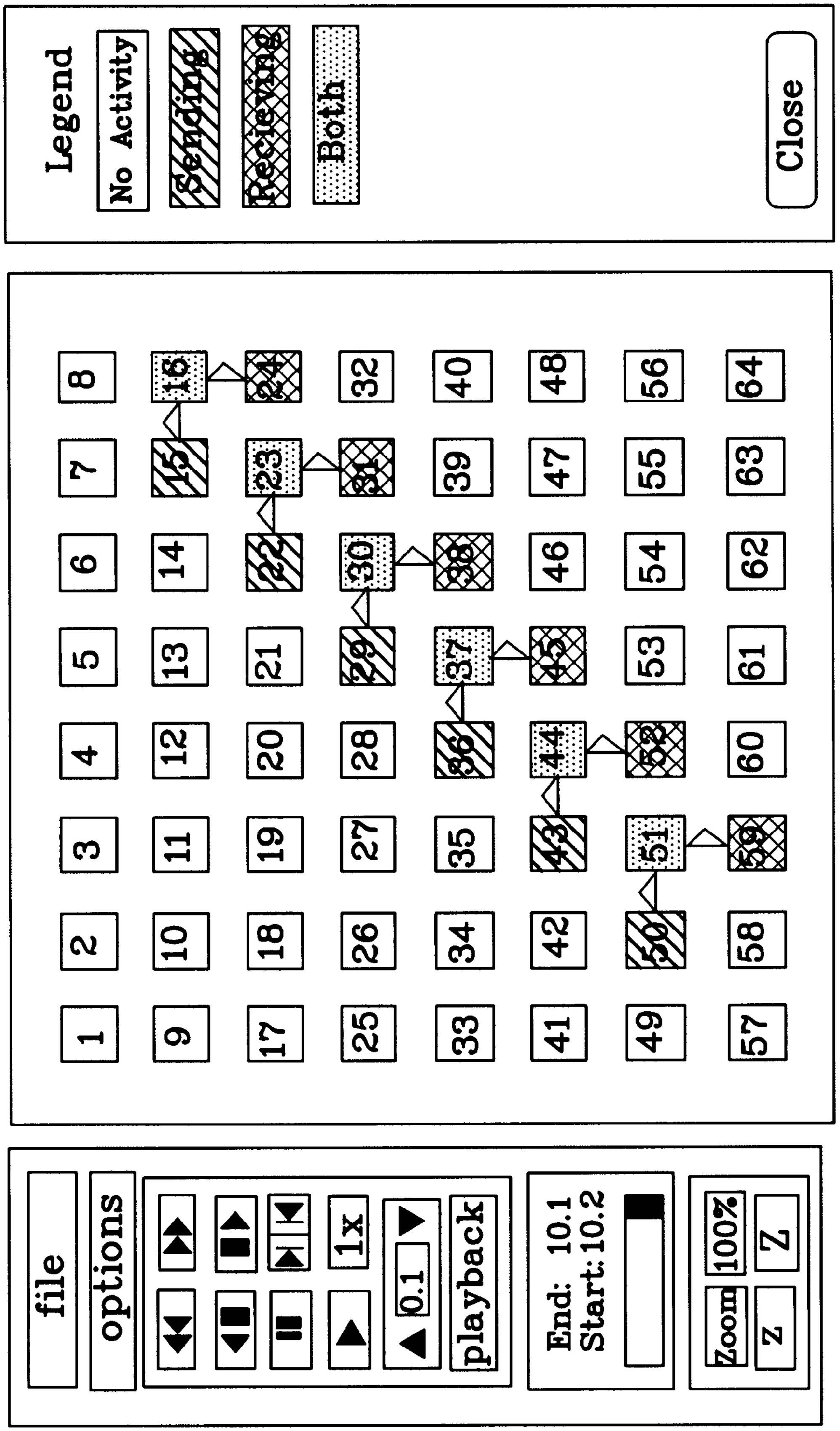
FIG. 6 shows a possible display for a system including discrete data in which the applicants' invention may be applied.

FIG. 6 shows another embodiment of the applicants' invention. A series of display elements labeled 1 through 64 is shown. Each element may for example, represent processors connected by a mesh network. Adjacent elements to a particular element represent other processors which are in direct communication with that particular element. During system operation, traffic between processors is shown on the graph as arrows between display elements. For example, processor 50 is shown as sending data to processor 51, which in turn is shown as sending data to processor 59.

Figure 5B:
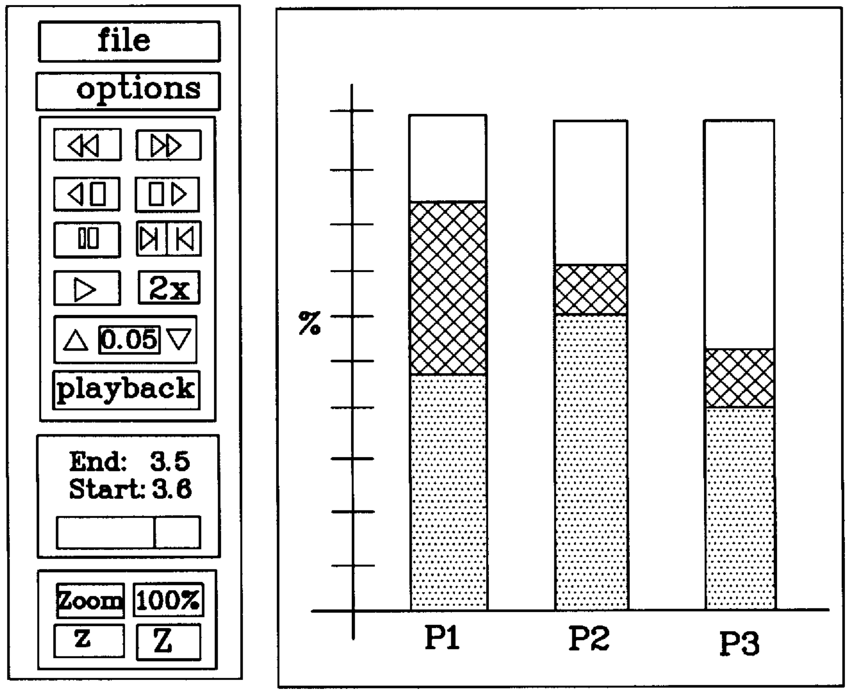

The left side of FIG. 6 shows the same control panel as seen in FIGS. 5*a* and 5*b*, and operates in a similar manner. A legend is shown on the right side of the graph which indicates the activity associated with the shade of each element. Dark shading is used to indicate that data is being sent; lighter shading is used to indicate that data is being received. Black is used to indicate both sending and receiving of data. For example, processor 50 is shown in the darker shading since it is sending data. Processor 59 is shown in a lighter shading as it is receiving data.

Networks traffic typically occurs in small bursts, making real-time evaluation of the transmissions difficult. Furthermore, the user of such a display will typically be interested in displaying patterns in the communications. For example, the user may be interested in which processors are doing most of the sending or receiving, which processors are doing both, or which processors may be idle for significant time periods.

Given the number of processors on the display, even if the display were updated at the Persistence of Vision, it is unlikely that the user would be able to detect trends in the transmission patterns of the processors because of the volume of data on the display. By instead aggregating the data and using a slower update rate, the user may be better able to detect patterns. One simple method of aggregation would be to take each data item in the aggregation period and check to see if all data items in that period are either send or receive. If some are send and some are receive, the send-receive color is used (i.e., black in this case). If all data items are send, the send color is used; if all data items are receive, the receive color is used. If all data items are idle, an idle color may also be used. In FIG. 6, no shading is used to indicate an idle state. of course, other more complicated methods are also possible, for example, the color of the processor may be graduated from dark to light based on the division of sends and receives (i.e., quantitative color blending). This method would provide some indication of the magnitude of the send and receive traffic for a particular processor. While the graphs only show use of send and receive traffic, the same graph could be used to show a number of different types of messages instead of, or in addition to, the send/receive traffic. Color schemes could be developed to indicate combinations of particular types of message traffic during aggregation, for example.

Figure 7:
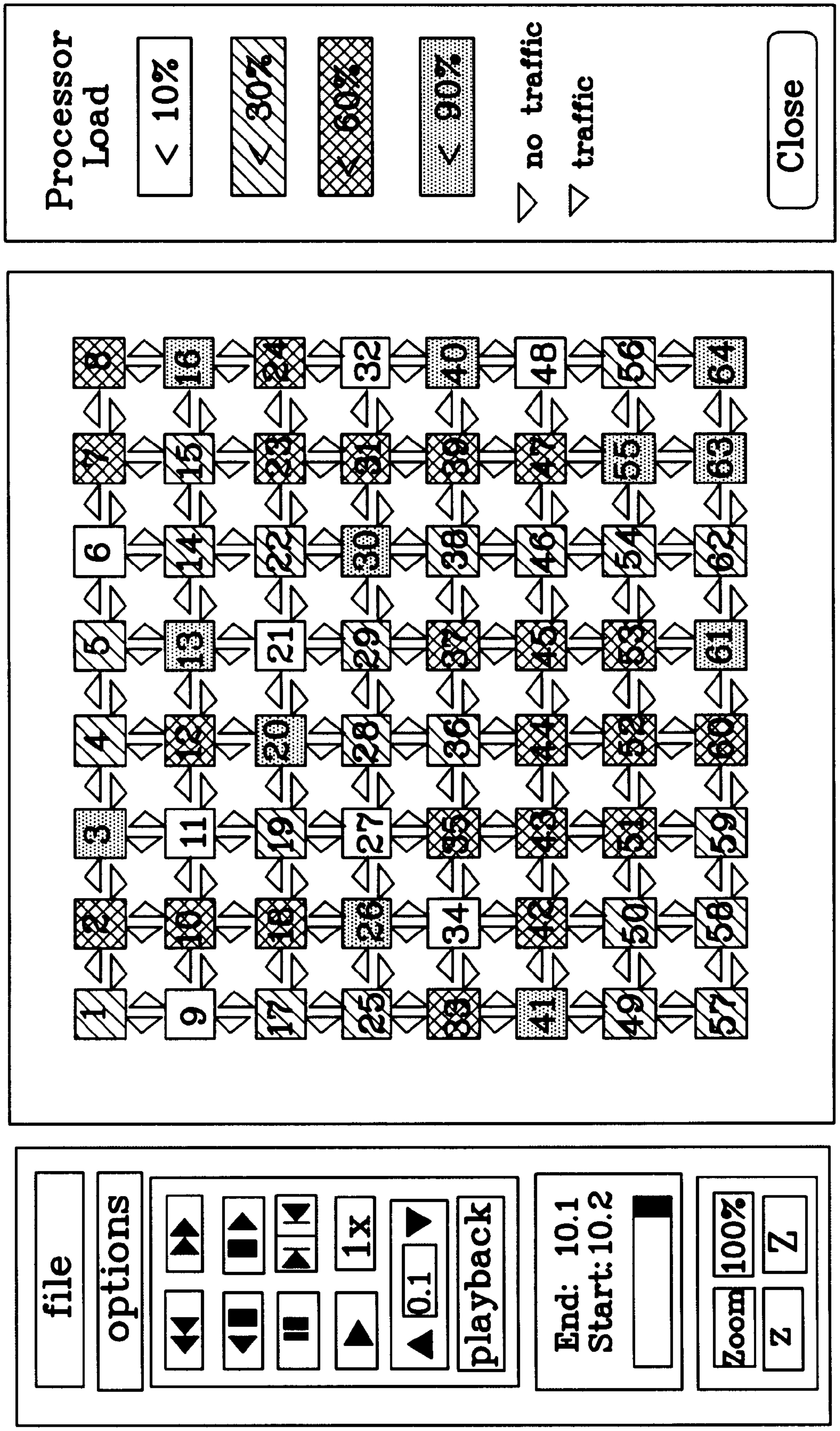
FIG. 7 shows an example of using aggregation to monitor processor traffic where load is indicated by the shading of each element.

As another example of using aggregation to monitor processor load and communication traffic volume, the graph of FIG. 7 shows traffic on a number of processors, but in this case traffic load is indicated by the color of each element, and arrows are used to indicate direction of the traffic. At real-time speed, the traffic on each process will likely vary substantially up and down, making any determination of overall load or load trends difficult. By applying aggregation, for example by averaging the load over the aggregated data items, the average load levels of each processor will emerge.

Figure 8:
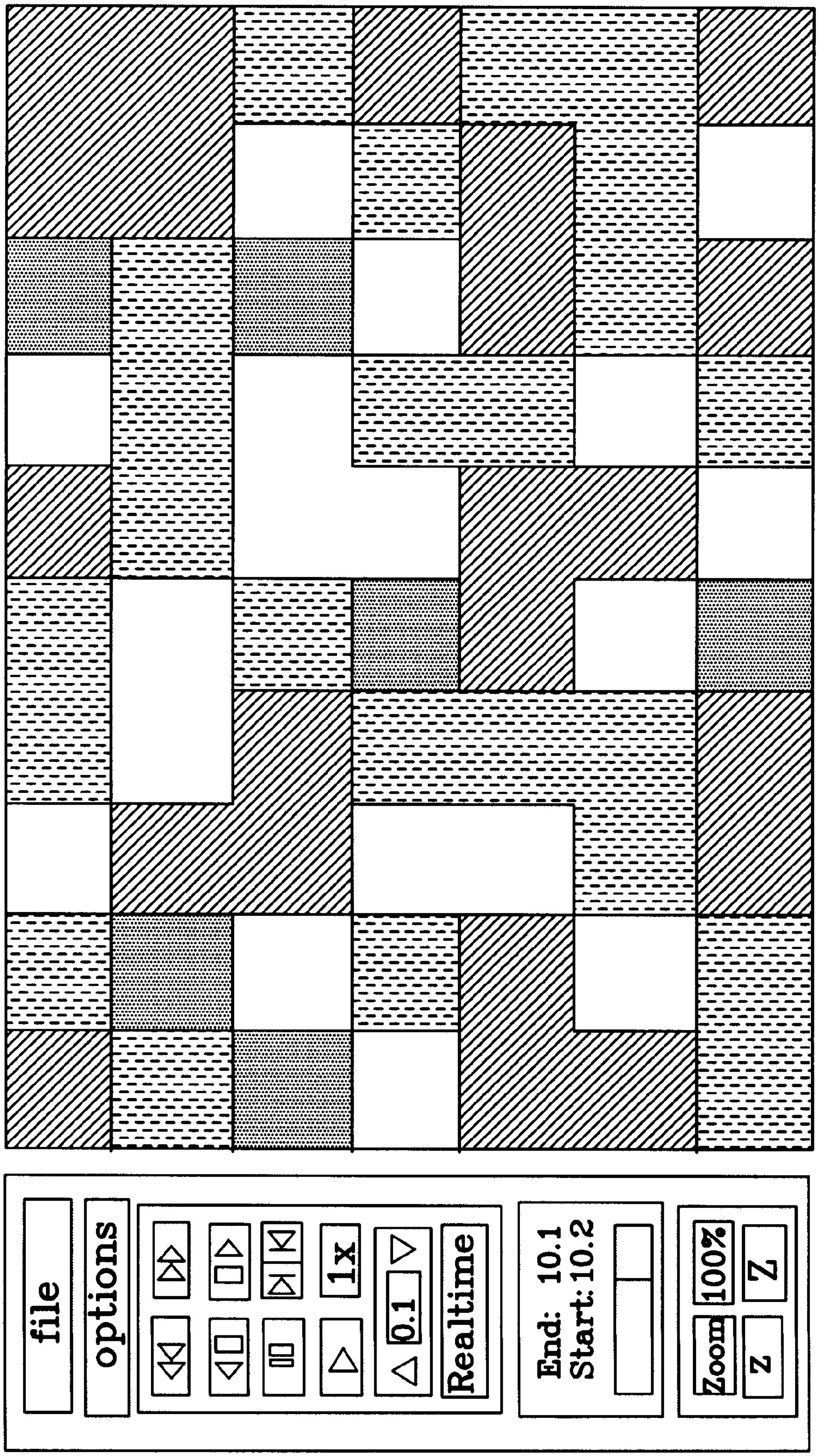
FIG. 8 shows an example of a system using aggregation, where system traffic is monitored, and a spatial relationship exists between display elements.

As a further example, FIG. 8 shows a traffic level graph, but in this case element connections have been eliminated. The graph of FIG. 8 may be useful for showing cellular phone traffic in a service area. The arrangement of the individual cells, as represented by each element, indicating geographic proximity. Thus, when aggregation is used with the graph, patterns in cell phone usage in different geographic regions can be examined.

While the aggregation for this graph might be done for each element (i.e. block), aggregation may also be done by combining data from two or more blocks together to for larger blocks on the screen of aggregated data. For example, each block of FIG. 8 may actually represent phone traffic collected from four smaller cellular phone region blocks.

The applicant would like to point out that while the same type of data could be displayed in another format, possibly at real-time speed, the applicant's use of aggregation, coupled with the compact graphs showing data from a large number of data streams, allows a single user to examine a substantially larger amount of information than would be possible with another type of system. For example, the graphs of FIGS. 6–8 could be done in real-time with a single graph for each data stream. This would however, require the user to examine 50 plus displays of data, and would likely not allow the user to make mental connections between loads on adjacent data streams, or examine data collected over a large time interval (i.e. several hours) to be viewed in a much smaller amount of time (e.g. minutes) without loss of significant aspects of the data.

As was mentioned earlier, one of the possible options which could be made available to a user of the applicant's system via the control panel is a selection among a number of aggregation methods. So far, we have described use of averaging data for continuous data, and selection of a third state for discrete data systems.

Aggregation techniques however can be tailored to the particular needs of the system. For example, quantitative color blending, which is essentially an averaging technique used for discrete data in which each color represent a different data level, would not indicate if some critical value was reached on any particular data sample. This aggregation technique could be modified to register critical values, and still provide color blending for any non-critical elements. FIGS. 9*a*–9*e* show one method of performing this aggregation technique.

FIGS. 9*a*–9*d* show the state of a network at four different instants. The shade of a block (i.e., element) indicates a change in the state of that block. The state of each block may, for example, represent the load on a processor associated with the block, indicated as percentages in the legend of FIG. 9*f*.

The user of the system may not only care about the average load of the processors, but may also care when any particular processor reaches a load level of 80–100 percent. If aggregation is not used, a 80–100 percent load signal only occurring for one sample could missed by the user. Thus, the aggregation method chosen should average the load level over the data items for each box, and also monitor each block for a 80–100 percent load level. To create the new aggregation technique, when outputting the aggregated data, the output should represent the average unless the a particular processor has a 80–100 percent load. If the 80–100 percent load is detected, the element should show that load level, rather than the average value.

Figure 9C:
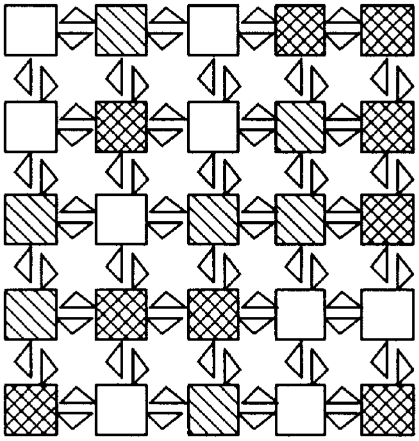
Figure 9F:
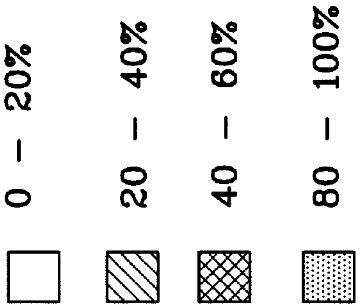
Figure 9B:
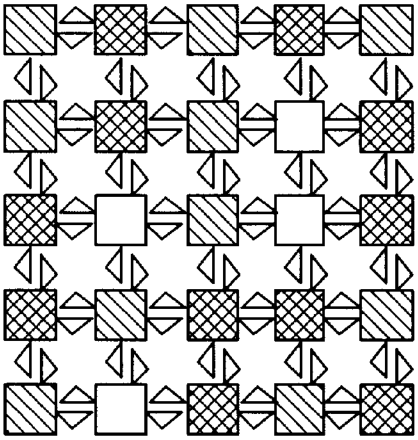
Figure 9E:
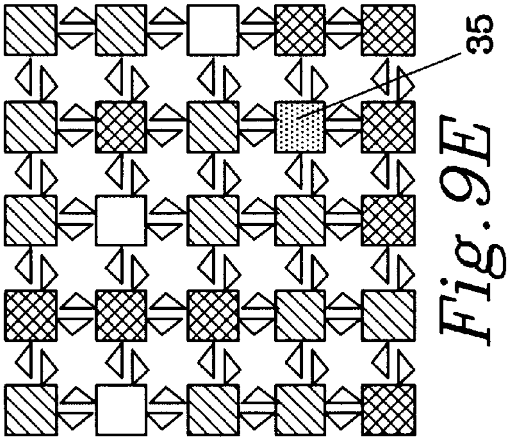
Figure 9A:
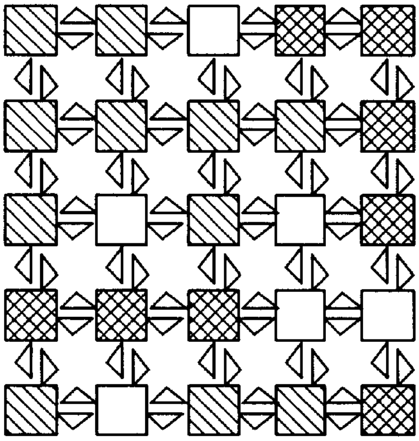
Figure 9D:
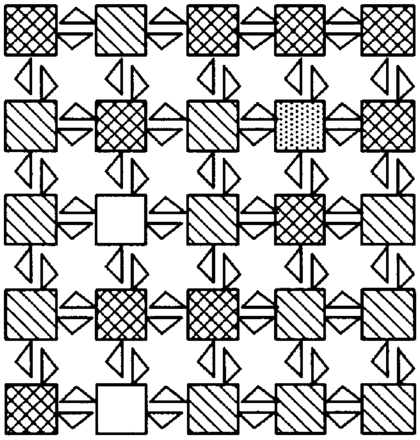

FIG. 9*e* shows the result of this aggregation for the sample data of FIGS. 9*a*–9*d*. Note that all boxes indicate an average of the shading for the four sample times except for the block in the second to last column in the second to last row of FIG. 9*e*, which has been labeled 35. That box shows a load level of at least 80 percent since one of the data items reached that level during the aggregation period.
Specifically, the processor associated with this box reached 80–100 percent load in the third sample of the aggregation, as shown in FIG. 9*c*. This technique is useful for both stored and real-time display of data. Of course, the user can still control the aggregation interval, and thereby increase the number of data items which are aggregated, without affecting detection for critical events, such as the 80–100 percent load in this example.

Another aggregation method which might be useful is multiple state recognition, or transition recognition. FIG. 10*a* shows one possible example of this aggregation method.

Assume that real-time data for the system as it appears in the first bar of FIG. 10*a*. Each of the segments in the first bar 40 represent data items at one minute intervals for a total of 92 minutes in the total bar. In the figure, three possible states occur in the stream of data, indicated by light shading 41, dark shading 42, or no shading 43. As a practical example, the light 41 and dark 42 shades may represent planes landing and taking off respectively, and no shading 43 may represent an idle runway. The user of this data may be interested in runway conflicts, idle periods, or congestion of take-offs or landings for a particular runway.

By applying multiple state recognition techniques to the data, some of these characteristics of the data may be more easily observable. The lower three bars 44, 45, and 46 in FIG. 10*a* show three levels of aggregation. Each section of the three bars represents a single display update. A third shade, such as indicate by the block labeled 47, has been added to these bars to indicate when more than two shades are present in the aggregation interval , except no shading represents that the runway is idle during some portion of the aggregation period, even if there is some landing or take-offs during that period. In the second bar 44, each segment represents 1.5 minutes, thus the aggregation interval is 1.5 minutes. In the third bar 45, each segment represent 3 minutes, thus the aggregation interval is 3 minutes. In the last bar 46, each segment represent 6 minutes, thus the aggregation interval is 6 minutes. Notice that by the level of aggregation of the lowest bar 46, there are obvious areas which distinguish themselves on the graphs. Specifically, the portion with no shading shows any aggregation interval including an idle period. For example, the single idle segment from the first bar 40, marked 48, passes through to the last bar 46, even though it is only 1 minute long. The user may now use this information to make desired decisions about plane traffic or other factors.

The data depicted in FIG. 10*a* may be either real-time data, or it may be stored data. In either case, the lower three bars may actually be compressed significantly, using aggregation, without loss of information on the screen. For example, if the segments of the last bar 46 are shrunk to the same width as the segments of the first bar 40, and the bars are made the same length, 552 minutes, or 9.2 hours can be displayed in the same amount of space that was used to show 92 minutes before. The portion of such a bar for the data FIG. 10*a* is shown in FIG. 10*b* in this compressed format.

It generally noted that while the Figures have been provided in black and white for simplicity as expediency in the Patent Office, the use of color for many of the displays is certainly contemplated and would obviously improve display readability, and allow differences between a larger range of values or a larger number of states to be detectable.

With the benefit of this discussion of the invention, one of ordinary skill in the art may be able to make changes in whole or in part to the components and functions that have been described to carry out the invention, without departing from the spirit of the invention. The invention should instead only be limited to what is described in the following claims.

What is claimed is:

1. A system for displaying the characteristics of time-varying data from one or more data streams comprised of a series of data items on a display which is updated at successive display update intervals characterized by:

means for producing a display control signal by aggregating a plurality of items of data from one or more of the time-varying data streams and producing the display control signal at the expiration of the display update interval; and means for producing one or more display elements on the display in response to the display control signal, the characteristics of the display element representing the characteristics of the time-varying data;

one or more of the data streams being discrete data; and said aggregation comprising selecting the data item occurring most or least often from one or more of the data streams.

2. The system of claim 1 wherein the data items aggregated fall with the display update interval.

3. The system of claim 1 wherein the data items aggregated come from a larger interval of time then the display update interval.

4. The system of claim 1 wherein the interval over which the data items are aggregated is controlled by the user.

5. The system of claim 1 wherein the means for producing a display control signal is capable of aggregating data items from both periodic and aperiodic data streams.

6. The system of claim 1 wherein:

the data stream comprises stored data items occurring at known periodic or aperiodic intervals;

the time interval on which data items are aggregated is selected by the user in proportion to the display update interval to cause the aggregated data to be viewed at a proportionally faster rate than the data items in the data streams originally occurred; and the time interval over which data items are aggregated may be changed while simultaneously viewing data.

7. The system of claim 1 wherein the user may select among a plurality of aggregation techniques while simultaneously viewing data.

8. The system of claim 7 wherein in the user may select different aggregation techniques for different data streams or groups of data streams while simultaneously viewing data.

9. The system of claim 1 wherein the display update interval is determined by the limitations of the user's perception.

10. The system of claim 1 wherein the display update interval is determined by the capabilities of the display.

11. The system of claim 1 wherein:

the data streams comprise data passing through a communication link, and;

the display update interval is determined by the limitations of the communication link.

12. The system of claim 1 wherein the display update interval is determined by either the limitations of the user's perception, the display, or the slowest communication link through which one or more of the data streams must pass.

13. The system of claim 1 wherein the display update interval is determined as a user preference.

14. The system of claim 13 wherein the display update interval may be selected by the user while simultaneously viewing data.

15. The system of claim 1 wherein the arrangement of the display elements on the display represents some relationship between the data streams.

16. The system of claim 1 wherein one or more of the data streams are digitized analog data or continuous-value digital data, and aggregation comprises an average of data from one or more of the data streams.

17. The system of claim 1 wherein one or more of the data streams are digitized analog data or continuous-value digital data, and aggregation comprises using a critical value of the data from one or more of the data streams, if that critical data value is reached or exceeded during the period of data aggregation, as part of the display control signal.

18. The system of claim 1 wherein one or more of the data streams are discrete data, and aggregation comprises one or more combinations, each of the combinations comprising at least two states within one or more of the data streams.

19. The system of claim 1 wherein one or more of the data streams are discrete data, each data value is assigned a different color, and the aggregation comprises a quantitative color blending of data item colors from one or more of the data streams.

20. A system for displaying the characteristics of time-varying data from one or more data streams comprised of a series of data items on a display which is updated at successive display update intervals characterized by:

means for producing a display control signal by aggregating a plurality of items of data from one or more of the time-varying data streams and producing the display control signal at the expiration of the display update interval; and means for producing one or more display elements on the display in response to the display control signal, the characteristics of the display element representing the characteristics of the time- varying data;

said data streams comprising stored data including an indication of the time interval between successive data items in the data streams; and the display update interval being shorter than the time interval between successive data items.

21. A method of displaying the characteristics of time-varying data from one or more data streams comprised of a series of data items on a display comprising:

selecting an display update interval for determining when the characteristics of data from one or more of the data streams will be displayed on the display;

aggregating a plurality of data items from on or more data streams; and displaying the aggregated data as one or more display elements at the end of the display update interval, each of the one or more display elements representing characteristics of data from one or more of the data streams, the visual characteristics of each of the display elements representing changes in the characteristics of one or more of the data streams, wherein said data items are discrete data, and said aggregation comprises selecting the data items occurring most or least often from one or more of the data streams.

22. The method of claim 21 wherein the data items aggregated come from a larger interval of time then the display update interval.

23. The method of claim 21 wherein the selection of the data items to be aggregated is controlled by the user.

24. The method of claim 21 wherein:

the data stream comprises stored data items occurring at known periodic or aperiodic intervals;

the time interval on which data items are aggregated is selected by the user in proportion to the display update interval to cause the aggregated data to be viewed at a proportionally faster rate than the data items in the data streams originally occurred;

and the time interval over which data items are aggregated may be changed while simultaneously using data.

25. The method of claim 21 wherein the user may select among a plurality of aggregation techniques while simultaneously viewing data.

26. The method of claim 25 wherein in the user may select different aggregation techniques for different data streams or groups of data streams while simultaneously viewing data.

27. The method of claim 21 where in the update rate is selected based on the capabilities of the display.

28. The method of claim 21 wherein the minimum length of time between one update of the display and the next update of the display is determined by the persistence of vision of the user.

29. The method of claim 21 wherein the minimum length of time between one update of the display and the next update of the display is determined by the maximum rate at which data can be transferred to the display.

30. The method of claim 21 wherein the minimum length of time between one update of the display and the next update of the display is chosen by as a preference by the user.

31. The method of claim 21 wherein the pre-defined update rate is determined by the slowest of either persistence of vision of the user, the capabilities of the display, or the slowest communication link through which the data must pass.

32. The method of claim 21 wherein the data collected is digitized analog data, and aggregation comprises an average of data from one or more of the data streams.

33. The method of claim 21 wherein the data collected is digitized analog data, and aggregation comprises a maximum or minimum limit for the data to be aggregated.

34. The method of claim 21 wherein the data collected is discrete data, and aggregation comprises a recognition of transitions between at least two states within the aggregated data.

35. The method of claim 21 wherein the data collected is discrete data, and aggregation comprises a quantitative color blending from one or more of the data streams.

36. The method of claim 21 wherein the arrangement of the display elements on the display represents some relationship between the data streams.

37. A method of displaying the characteristics of time-varying data from one or more data streams comprised of a series of data items on a display comprising:

selecting an display update interval for determining when the characteristics of data from one or more of the data streams will be displayed on the display;

aggregating a plurality of data items from on or more data streams; and displaying the aggregated data as one or more display elements at the end of the display update interval, each of the one or more display elements representing characteristics of data from one or more of the data streams, the visual characteristics of each of the display elements representing changes in the characteristics of one or more of the data streams the data streams comprising stored data including an indication of the time interval between successive data times in the data streams; and the display update interval being shorter than the time interval between successive data items.

* * * * *